(12) United States Patent
Shih

(10) Patent No.: US 9,924,241 B2
(45) Date of Patent: Mar. 20, 2018

(54) INTELLIGENT PATCHING SYSTEMS AND METHODS USING COLOR IDENTIFICATION TAGS AND RELATED EQUIPMENT

(71) Applicant: CommScope, Inc. of North Carolina, Hickory, NC (US)

(72) Inventor: Yi-Teh Shih, Richardson, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 15/218,969

(22) Filed: Jul. 25, 2016

(65) Prior Publication Data

US 2017/0034597 A1 Feb. 2, 2017

Related U.S. Application Data

(60) Provisional application No. 62/198,732, filed on Jul. 30, 2015.

(51) Int. Cl.
*H04Q 1/00* (2006.01)
*H04Q 1/02* (2006.01)
*H01R 24/64* (2011.01)
*H01R 13/46* (2006.01)

(52) U.S. Cl.
CPC .......... *H04Q 1/136* (2013.01); *H01R 13/465* (2013.01); *H01R 24/64* (2013.01); *H04Q 1/138* (2013.01)

(58) Field of Classification Search
CPC .......... H04Q 1/13; H04Q 1/131; H04Q 1/133; H04Q 1/135; H04Q 1/136; H04Q 1/138
See application file for complete search history.

(56) References Cited

U.S. PATENT DOCUMENTS

| | | | | |
|---|---|---|---|---|
| 6,661,956 B2* | 12/2003 | Yamasaki | ............ | G02B 6/4482 385/109 |
| 7,298,946 B2* | 11/2007 | Mueller | ............... | G02B 6/4482 385/100 |
| 7,605,707 B2* | 10/2009 | German | ............... | H01R 13/465 340/572.7 |
| 7,811,119 B2* | 10/2010 | Caveney | ................ | H04Q 1/136 439/489 |
| 7,938,700 B2* | 5/2011 | Jacks | ................... | H01R 13/641 361/780 |

(Continued)

FOREIGN PATENT DOCUMENTS

GB 2493984 A * 2/2013 ............. H04Q 1/136

*Primary Examiner* — Brian Miller
(74) *Attorney, Agent, or Firm* — Fogg & Powers LLC

(57) ABSTRACT

In one embodiment, a patch cord comprises: a communications cable that includes a first conductor and a second conductor that form a first differential pair, a third conductor and a fourth conductor that form a second differential pair; a fifth conductor and a sixth conductor that form a third differential pair, a seventh conductor and an eighth conductor that form a fourth differential pair; and a plug that is attached to a first end of the communications cable, the plug comprising: a plug housing that receives the communications cable; first through eighth plug contacts that each are at least partially within the housing and that are electrically connected to the respective first through eighth conductors; and a color identification tag that has a first color pattern that is a unique identifier for the patch cord.

20 Claims, 6 Drawing Sheets

(56) References Cited

U.S. PATENT DOCUMENTS

| | | | | |
|---|---|---|---|---|
| 8,128,428 B2* | 3/2012 | Caveney | ............... | H04Q 1/149 439/490 |
| 8,181,229 B2* | 5/2012 | Macauley | ............... | H04Q 1/138 340/572.7 |
| 8,384,522 B2* | 2/2013 | Macauley | ............... | G01S 5/14 340/10.1 |
| 8,588,050 B2* | 11/2013 | Caveney | ............... | H04Q 1/136 370/200 |
| 8,752,768 B2* | 6/2014 | Gao | ............... | G06K 7/10 235/462.41 |
| 8,936,194 B1* | 1/2015 | Welch | ............... | G06K 7/1417 235/435 |
| 8,994,547 B2* | 3/2015 | German | ............... | H04Q 1/136 340/10.1 |
| 9,025,418 B2* | 5/2015 | Liang | ............... | H04Q 1/136 367/197 |
| 9,093,774 B2* | 7/2015 | Chang | ............... | H01R 13/465 |
| 9,179,021 B2* | 11/2015 | Latta | ............... | H04N 1/00347 |
| 9,396,421 B2* | 7/2016 | Rujan | ............... | G06K 7/1417 |
| 9,569,940 B2* | 2/2017 | Cudak | ............... | G08B 5/38 |
| 9,620,941 B2* | 4/2017 | Tucker | ............... | H02B 15/00 |
| 2003/0061393 A1* | 3/2003 | Steegmans | ............... | H04L 12/24 709/250 |
| 2004/0219824 A1* | 11/2004 | Conn | ............... | G06F 1/181 439/490 |
| 2006/0160395 A1* | 7/2006 | MacAuley | ............... | H04Q 1/136 439/344 |
| 2008/0122579 A1* | 5/2008 | German | ............... | H01R 13/6683 340/10.1 |
| 2008/0253556 A1* | 10/2008 | Cobb | ............... | H04Q 1/136 379/442 |
| 2009/0020609 A1* | 1/2009 | Cohen | ............... | G06K 7/1095 235/462.01 |
| 2012/0045928 A1* | 2/2012 | Caveney | ............... | H04Q 1/138 439/488 |
| 2014/0273611 A1* | 9/2014 | Goggin | ............... | H01R 13/465 439/491 |
| 2015/0279517 A1* | 10/2015 | Boudreaux | ............... | H01B 7/365 174/74 R |
| 2016/0140374 A1* | 5/2016 | Ye | ............... | G06K 7/146 235/437 |
| 2016/0148083 A1* | 5/2016 | Osborne | ............... | G06K 19/06112 235/375 |
| 2016/0161697 A1* | 6/2016 | Lang | ............... | G02B 6/447 385/112 |

* cited by examiner

INTELLIGENT PATCHING SYSTEMS AND METHODS USING COLOR IDENTIFICATION TAGS AND RELATED EQUIPMENT

CROSS-REFERENCE TO RELATED APPLICATIONS

This U.S. patent application claims priority to, and the benefit of, U.S. Provisional Application No. 62/198,732 entitled "INTELLIGENT PATCHING SYSTEMS AND METHODS USING COLOR IDENTIFICATION TAGS AND RELATED EQUIPMENT" filed on Jul. 30, 2015, which is herein incorporated by reference in its entirety.

FIELD OF THE INVENTION

The present disclosure relates generally to communications systems and, more particularly, to tracking patch cord connections in communications systems.

BACKGROUND

Most businesses, agencies, schools and other organizations employ dedicated communications systems that enable computers, servers, printers, facsimile machines, telephones, security cameras and the like to communicate with each other, through a private network, and with remote locations via a telecommunications service provider. Typically, network equipment (e.g., network switches, servers, memory storage devices, etc.) of the communications system will be located in a computer room of a building. Communications cables are routed through the walls and/or ceilings of the building. Typically, the communications cables are so-called "Ethernet" communications cables that contain eight (or more) insulated conductors such as copper wires that are arranged as four twisted pairs of conductors. Each twisted pair may be used to transmit a separate differential communications signal. A first end of each cable is connected to a respective connector port on the network equipment. Communications connectors such as RJ-45 style modular jacks (which are often referred to as "work area outlets") are mounted in offices, conference rooms and other work areas throughout the building. The second end of each communications cable may connect to one of these communications connectors to provide communications paths from the work area outlets to the network equipment in the computer room. Communications cables from external telecommunication service providers may also terminate within the computer room.

A commercial data center is a facility that may be used to run the computer-based applications that handle the core electronic business and operational data of one or more organizations. The expansion of the Internet has also led to a growing need for a so-called "Internet data centers," which are data centers that are used by online retailers, Internet portals, search engine companies and the like to provide large numbers of users simultaneous, secure, high-speed, fail-safe access to their web sites. Both types of data centers may host hundreds, thousands or tens of thousands of servers, routers, memory storage systems and other associated equipment. In these data centers, fiber optic communications cables and/or Ethernet communications cables are typically used to provide a hard-wired communications system that interconnects the data center equipment.

In both office building and data center communications systems, the communications cables that are connected to end devices (e.g., network servers, memory storage devices, network switches, work area computers, printers, etc.) may terminate into one or more communications patching systems that may simplify later connectivity changes. Typically, a patching system includes one or more "patch panels" that are mounted on equipment rack(s) or in cabinet(s), and a plurality of "patch cords" that are used to make interconnections between different pieces of equipment. As is known to those of skill in the art, a "patch cord" refers to a communications cable (e.g., an Ethernet cable or a fiber optic cable) that has a connector such as, for example, an RJ-45 plug or a fiber optic connector, on at least one end thereof. A "patch panel" refers to an inter-connection device that includes a plurality (e.g., 24 or 48) of connector ports (herein the term "connector port" is used generically to refer to any type of communications connector that can receive a patch cord connector such as RJ-45 jacks, fiber optic adapters, fiber optic connectors, RJ-11 jacks, etc.). Each connector port on a patch panel may have a plug aperture on a front side thereof that is configured to receive the connector of a patch cord (e.g., an RJ-45 plug), and the back end of each connector port is typically configured to receive a communications cable or another patch cord.

In a typical office network, "horizontal" cables are used to connect each work area outlet (which typically are RJ-45 jacks) to the back end wire connection terminals of a respective connector port (which also typically are RJ-45 jacks) on a first set of patch panels. In an "inter-connect" patching system, a single set of patch cords is used to directly connect the connector ports on the first set of patch panels to respective connector ports on network switches. In a "cross-connect" patching system, a second set of patch panels is provided, and the first set of patch cords is used to connect the connector ports on the first set of patch panels to respective connector ports on the second set of patch panels, and a second set of typically single-ended patch cords is used to connect the connector ports on the second set of patch panels to respective connector ports on the network switches.

The connections between the work area end devices and the network switches may need to be changed for a variety of reasons, including equipment changes, adding or deleting users, office moves, etc. In an inter-connect patching system, these connections are typically changed by rearranging the patch cords that run between the first set of patch panels and the network switches. In a cross-connect patching system, the connections between the work area end devices and the network switches are typically changed by rearranging the patch cords that run between the first set of patch panels and the second set of patch panels. Both types of patching systems allow a technician to easily implement connectivity changes by, for example, simply unplugging one end of a patch cord from a first connector port on one of the patch panels in the first set of patch panels and then plugging that end of the patch cord into a second connector port on one of the patch panels in the first set of patch panels. Similar patching systems are used in data centers.

The connectivity between the connector ports on the network switches and work area outlets or data center equipment is typically recorded in a computer-based log. Each time patching changes are made (i.e., patch cords are rearranged), this computer-based log is updated to reflect the new patching connections. Unfortunately, in practice technicians may neglect to update the log each and every time a change is made, and/or may make errors in logging changes. As such, the logs may not be complete and/or accurate.

In order to reduce or eliminate such logging errors, a variety of so-called "intelligent" patching systems have been proposed that automatically log the patch cord connections in a communications patching system. For example, U.S. Pat. No. 6,222,908 ("the '908 patent") describes a communications patching system in which each patch cord connector (e.g., plug) includes a unique identifier, and each connector port on the patch panels includes a sensor that reads the unique identifier on any patch cord connector inserted therein. In the system of the '908 patent, the intelligent patch panel transmits the unique identifier for a patch cord that is plugged into or removed from a connector port along with identification of the connector port at which the patching change was made to a system administration computer that logs each change to the patch cord connections in a connectivity database. Other intelligent patching systems employ sensors, radio frequency identification ("RFID") tags, serial ID chips, common mode communications channels and the like to detect patch cord insertions and removals and/or to automatically track patching connections. Typically, these systems require that all of the patch panels in the patching system have these automatic tracking capabilities and, in inter-connect systems, may also require that the network switches include automatic tracking capabilities as well.

SUMMARY

The embodiments of the present disclosure provide intelligent patching systems and methods using color identification tags and related equipment and will be understood by reading and studying the following specification.

In one embodiment, a patch cord comprises: a communications cable that includes a first conductor and a second conductor that form a first differential pair, a third conductor and a fourth conductor that form a second differential pair; a fifth conductor and a sixth conductor that form a third differential pair, a seventh conductor and an eighth conductor that form a fourth differential pair; and a plug that is attached to a first end of the communications cable, the plug comprising: a plug housing that receives the communications cable; first through eighth plug contacts that each are at least partially within the housing and that are electrically connected to the respective first through eighth conductors; and a color identification tag that has a first color pattern that is a unique identifier for the patch cord.

DRAWINGS

DETAILED DESCRIPTION

Figure 1:
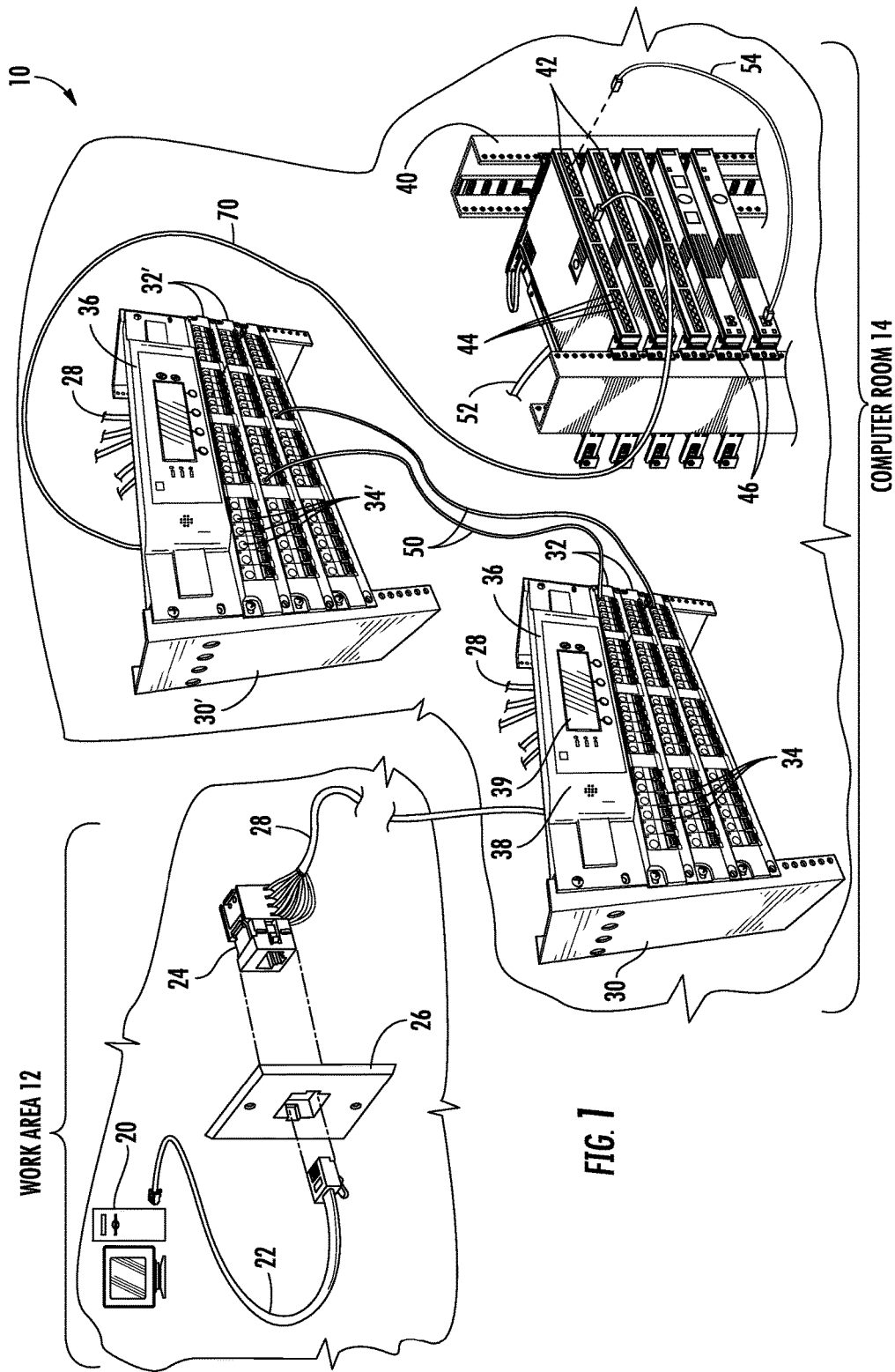
FIG. 1 is a simplified, schematic view of an exemplary cross-connect communications system on which intelligent patching techniques according to embodiments of the present disclosure may be used.

Pursuant to embodiments of the present disclosure, methods and systems for automatically tracking patch cord connectivity in a communications system are provided that use color sensing devices. These color sensing devices are used to read color identification tags that are included on the connectors of each of the patch cords of the communications system. Each color identification tag may include a color pattern. The color patterns included on the color identification tags of the two connectors of a patch cord may be identical, and may be different from the color patterns included on the connectors of all other patch cords of the communications system. Accordingly, the color patterns may serve as unique identifiers for each patch cord used in the communications system.

The color sensing devices may comprise, for example, charge-coupled devices or other electronic or optical devices that can detect colors in their field-of-view. A color sensing module that includes a plurality of color sensing devices may be mounted on each patching device in the communications system above or below the connector ports thereof. When a first connector of a patch cord is inserted into a connector port of a first of these patching devices, one or more color sensing devices that are included on the color sensing module for the first patching device may detect the colors that form the color pattern that is included on the color identification tag that is mounted on the first connector of the patch cord. The color sensing module may transmit the information regarding the detected color pattern and an identification of the connector port that received the first connector of the patch cord to an intelligent patching controller for the communications system. When a second connector of the patch cord is inserted into a connector port of a second of these patching devices, one or more color sensing devices that are included on the color sensing module for the second patching device may similarly detect the colors that form the color pattern that is included on the color identification tag that is mounted on the second connector of the patch cord, and the color sensing module may then forward information regarding this color pattern and an identification of the connector port that received the second connector of the patch cord to the intelligent patching controller. The intelligent patching controller may determine that the connector port of the first patching device is connected by a patch cord to the connector port of the second patching device based on receipt of information indicating that patch cord connectors having the same color pattern were received in those two connector ports, and may then log this patching connection into a connectivity database.

The methods and systems according to embodiments of the present disclosure may be used to track patching connections between two patch panel fields (i.e., in cross-connect patching systems) or between a patch panel field and a plurality of network switches (i.e., in inter-connect patching systems). The methods and systems may work with both copper-based Ethernet communications systems and with optical fiber based communications systems.

The intelligent patching systems and methods according to embodiments of the present disclosure may provide a cost-effective way for automatically tracking patch cord connections. As noted above, intelligent patching systems that use RFID and serial ID technology have been proposed. However, serial ID systems typically require two additional conductors in each patch cord, along with additional connectors for these conductors in both the patch cord plugs and in the connector ports. This can significantly increase the cost of the communications system. Likewise, conventional RFID approaches typically require an RFID transceiver on (at least) every patch panel as well as RFID antennas at every connector port and additional switching or multiplexing technology. Adding this equipment may be expensive and it may be difficult to implement on network switches. Moreover, while the use of bar codes on patch cords and bar code readers at patch panels has been proposed as an alternative intelligent patching solution, bar codes may have limited storage capacity and may be difficult to consistently read. The intelligent patching systems according to embodiments of the present disclosure may provide cost and implementation advantages over serial ID, RFID and other technology complex solutions, while providing improved reliability, expandability and ease of use as compared to other proposed systems.

Embodiments of the present disclosure will now be discussed in more detail with reference to the drawings.

FIG. 1 is a schematic view of a cross-connect communications system 10 that may be used to connect computers, printers, Internet telephones and other end devices that are located in work areas throughout a building to network equipment that is located, for example, in a computer room of the building. The intelligent patching techniques discussed herein may be implemented in the communications system 10. FIG. 1 is provided to show how a patching system may be interposed between various end devices in order to facilitate later connection changes between the end devices. The intelligent patching techniques disclosed herein suing color identification tags and color sensing devices may be used to automatically track patching connections in the communications system 10 of FIG. 1.

As shown in FIG. 1, an exemplary computer 20 or other end device is located in a work area 12 of the building. The computer 20 is connected by a patch cord 22 to a modular wall jack 24 that is mounted in a wall plate 26 in work area 12. A communications cable 28 is routed from the back end of the wall jack 24 through, for example, the walls and/or ceiling of the building, to a computer room 14. As there may be hundreds or thousands of work area wall jacks 24 in an office building, a large number of cables 28 may be routed into the computer room 14. While only a single work area end device (computer 20) is shown in FIG. 1 to simplify the drawing, it will be appreciated that there would be hundreds or thousands of work area end devices in a typical communications system.

A first equipment rack 30 is provided in the computer room 14. A plurality of patch panels 32 are mounted on the first equipment rack 30. Each patch panel 32 includes a plurality of connector ports 34. Each cable 28 from the wall jacks 24 in the work area 12 is terminated onto the back end of one of the connector ports 34 of one of the patch panels 32. In FIG. 1, each connector port 34 comprises an RJ-45 jack. However, it will be appreciated that other types of connector ports may be used.

A rack controller 36 may also be mounted on the first equipment rack 30. The rack controller 36 may include a central processing unit ("CPU") 38 and a display 39. The rack controller 36 may be interconnected with rack controllers that are provided on other patch panel equipment racks of the communications system (only two such rack controllers 36 are shown in the example of FIG. 1) so that the rack controllers 36 can communicate in a common network as if they were a single controller. The CPU 38 of rack controller 36 may include a remote access port that enables the CPU 38 to be accessed by a remote computer such as, for example, a system administrator computer (not shown in FIG. 1). The rack controller 36 may, for example, gather data from intelligent tracking capabilities of the communications system 10, as will be explained herein.

The communications patching system 10 further includes a second set of patch panels 32' that are mounted on a second equipment rack 30'. Each patch panel 32' includes a plurality of connector ports 34', and a rack controller 36 may also be mounted on the second equipment rack 30'. A first set of patch cords 50 is used to interconnect the connector ports 34 on the patch panels 32 to respective ones of connector ports 34' on the patch panels 32'.

As is further shown in FIG. 1, network devices such as, for example, one or more network switches 42 and network routers and/or servers 46, are mounted on a third equipment rack 40. Each of the switches 42 may include a plurality of connector ports 44, and each network router and/or server 46 may also include one or more connector ports. One or more external communications lines 52 are connected to at least some of the network devices 46 (either directly or through a patch panel that is not shown in FIG. 1). A second set of single-ended patch cords 70 connects the connector ports 44 on the switches 42 to respective ones of the back ends of the connector ports 34' on the patch panels 32'. A third set of patch cords 54 may be used to interconnect other of the connector ports 44 on the switches 42 with the connector ports provided on the network routers/servers 46. In order to simplify FIG. 1, only two patch cords 50, a single patch cord 70 and a single patch cord 54 are shown.

The communications patching system of FIG. 1 may be used to connect each work area computer 20 or other work area end device to the network switches 42, the network switches 42 to the network routers and servers 46, and the network routers/servers 46 to external communications lines 52, thereby establishing the physical connectivity required to give devices 20 access to both local and wide area networks. In the cross-connect patching system of FIG. 1, connectivity changes are typically made by rearranging the patch cords 50 that interconnect the connector ports 34 on the patch panels 32 with respective of the connector ports 34' on the patch panels 32'. It should also be noted that the patching connections may also be between patch panels that are mounted on the same equipment rack or even between connector ports on the same patch panel.

The intelligent patching systems and methods disclosed herein may be used, for example, to automatically track new patching connections and changes to the patching connections in the communications system 10 of FIG. 1. In particular, each of the patch panels 32, 32' may include color sensing modules (discussed below) and each of the patch cords 50 may include color identification tags (also discussed below). The color sensing modules may operate to automatically track which patch cords 50 are connected to which connector ports 34, 34' and may pass this information to an intelligent patching controller so that the computer-based log of patching connections may automatically be kept up to date.

Figure 2:
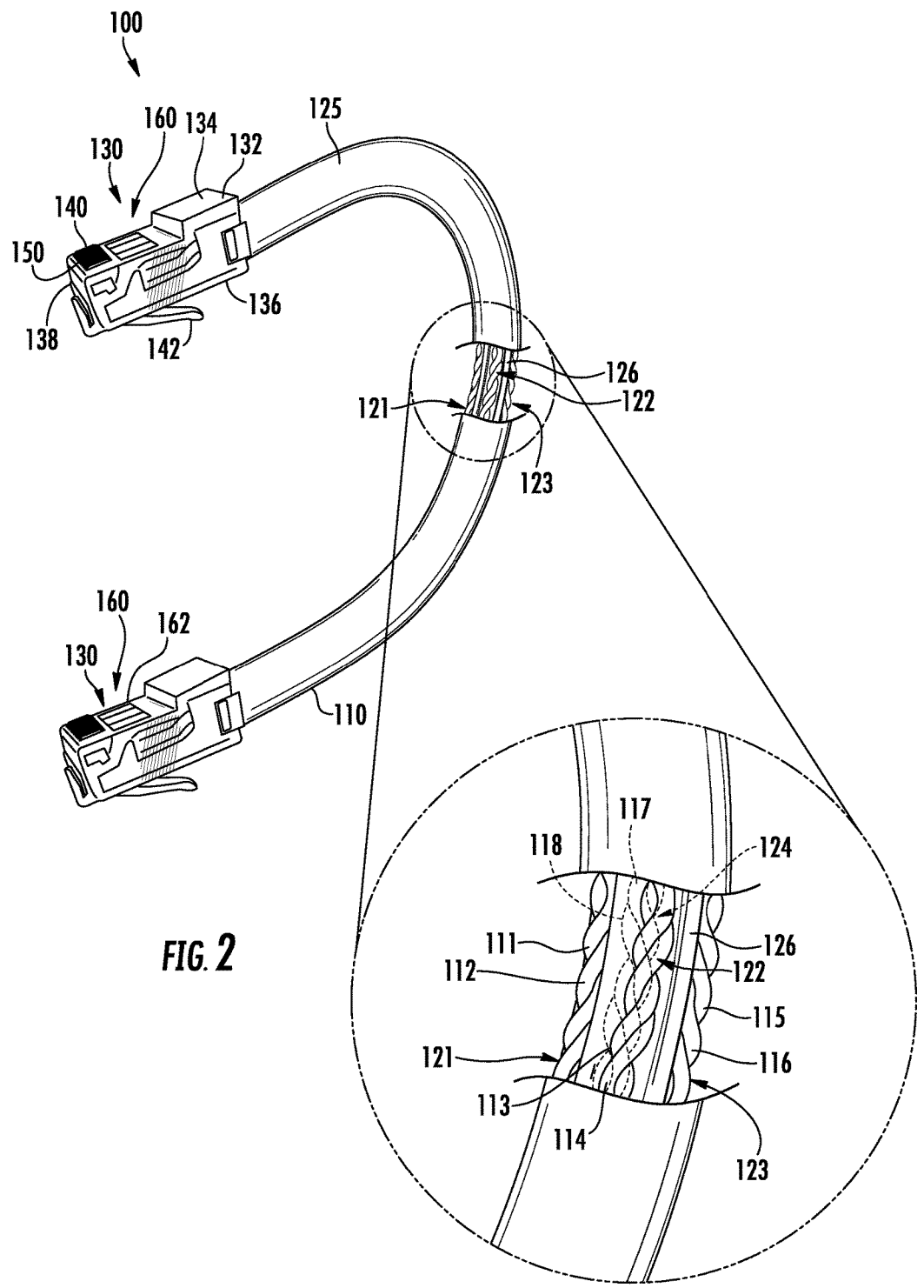
FIG. 2 is a schematic perspective view of a patch cord according to embodiments of the present disclosure.

FIG. 2 is a perspective view of an example patch cord 100 according to embodiments of the present disclosure. As shown in FIG. 2, the patch cord 100 includes a communications cable 110 and first and second plug connectors 130. The communications cable 110 includes eight insulated conductors 111-118 that are configured as four twisted pairs of conductors 121-124. Each twisted pair of conductors 121-124 is configured to carry a differential signal. The eight insulated conductors 111-118 are enclosed in a jacket 125. A pair divider 126 such as a tape or a cruciform structure may run longitudinally through the communications cable 110 to separate at least some of the twisted pairs 121-124 from other of the twisted pairs 121-124 to reduce crosstalk between the twisted pairs.

Each plug connector 130 includes a housing 132 that has a top surface 134, a bottom surface 136, a front surface 138 and a rear surface that has an opening (not visible) that receives a respective end of the communications cable 110. Eight longitudinal slots 140 extend along the top surface 134 of the housing, and these slots 140 may also extend onto the front surface 138 of the housing 132. A plurality of plug contacts 150 such as metal plug blades may be mounted within the housing 132 so that a portion of each plug contact 150 is exposed through the respective slots 140. Each of the insulated conductors 111-118 of the communications cable 110 may be electrically connected to a respective one of the plug contacts 150. In some embodiments, each plug contact 150 may include an integral wire connection structure (not visible in FIG. 2) such as an insulating piercing contact or an insulation displacement contact so that the insulated conductors 111-118 may directly terminate into their respective plug contacts 150 within the housing 132. In other embodiments, intermediate structures such as a printed circuit board (not shown) may be provided so that each insulated conductor 111-118 is terminated into the printed circuit board as are each of the plug contacts 150, and conductive structures within the printed circuit board electrically connect each insulated conductor 111-118 to its respective plug contact 150. A plug latch 142 extends downwardly from the bottom surface 136 of the housing 132. The plug connectors 130 may each comprise an RJ-45 plug. Each plug connector 130 also includes a color identification tag 160. In the illustrated embodiment, the color identification tag 160 is located on the top surface 134 of the housing 132.

While FIG. 2 depicts an Ethernet patch cord 100, it will be appreciated that other types of patch cords such as fiber optic jumper cables may include color identification tags and be used in the intelligent patching systems according to embodiments of the present disclosure.

Figure 3A:
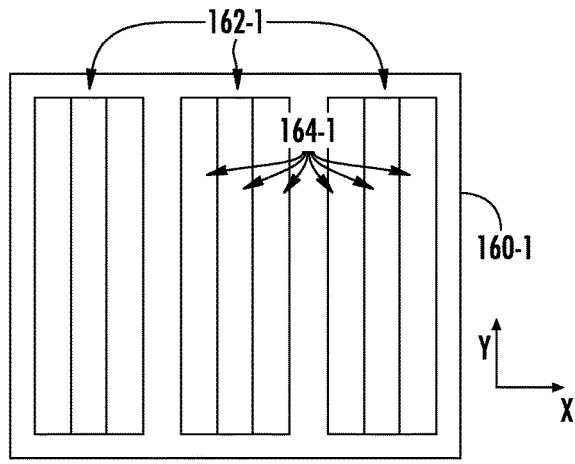
FIGS. 3A-3C are schematic views of example color identification tags according to embodiments of the present disclosure.
Figure 3B:
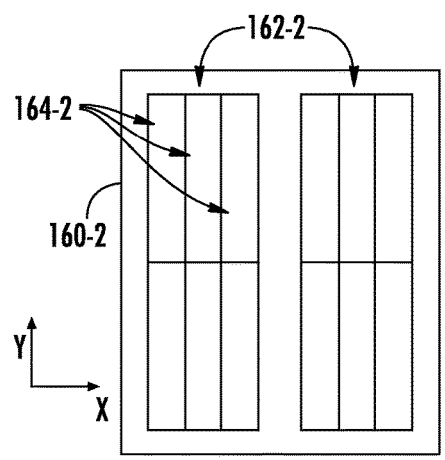
Figure 3C:
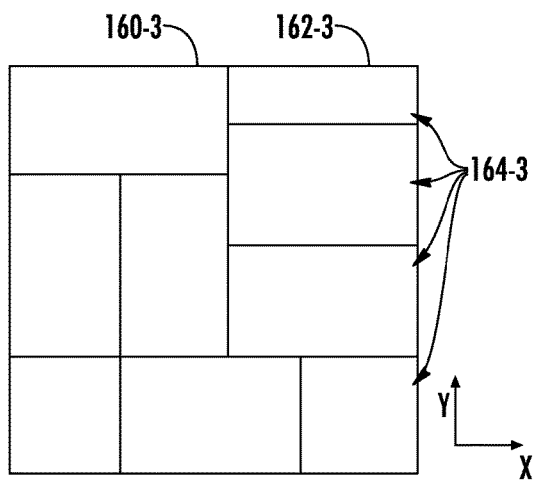

FIGS. 3A-3C are enlarged schematic illustrations of illustrate three example color identification tags 160-1 through 160-3 according to embodiments of the present disclosure.

As shown in FIGS. 3A-3C, each color identification tag 160 includes a color pattern 162. The color pattern 162 refers to a one-dimensional or two-dimensional array that is divided into a plurality of predefined regions 164. Each region 164 may be one of a plurality of pre-selected colors. In some embodiments, each region 164 may be either red, green or blue. It will be appreciated, however, that embodiments of the present disclosure are not limited thereto, and that more or less than three colors may be used, and that colors different than red, green and blue may be used. Transparent regions may also be provided that would have the color of whatever is beneath the transparent region in still other embodiments. In the example of FIG. 3A, the color identification tag 160-1 comprises three strips that are each longitudinally sub-divided into three regions 164-1. Thus, the three strips form a one-dimensional array that has a total of nine regions 164-1. Each region 164-1 may have one of three colors, such as red, green or blue. Table I shows the different combinations of colors that each of the three strips may have, where the three letters included in each entry in the table represent the color of the three regions 164-1 included in the strip, and where "R" stands for red, "B" stands for blue, and "G" stands for green.

TABLE 1

| RRR | RBB | RBG | BRR | BBB | BBG | GRR | GBB | GBG |
|-----|-----|-----|-----|-----|-----|-----|-----|-----|
| RRB | RRG | RGB | BRB | BRG | BGB | GRB | GRG | GGB |
| RBR | RGR | RGG | BBR | BGR | BGG | GBR | GGR | GGG |

As shown in Table 1, each of the three strips may have twenty-seven different color combinations. Thus, the three strips will have 27×27×27=19,683 different possible color patterns 162-1. Each of these color patterns 162-1 may serve as a unique identifier for a patch cord 100. Thus, for a communications system that has less than 19,683 patch cords 100, color identification tags 160-1 that have nine different regions 164-1, each of which is in a predetermined location and each of which has one of three colors, may serve to provide a unique identifier for every patch cord 100 in the communications system.

In the embodiment of FIG. 3A, the color pattern 160-1 includes nine regions 164-1 that are aligned in a row, and only one region 164-1 is provided along any coordinate in the x-direction. The y-direction may correspond to the "longitudinal" direction of the plug connector 130 that the color identification tag 160-1 is mounted on (i.e., the direction defined by the length of the communications cable 110 when the communications cable is held taunt). This design allows the color sensing devices that are included on the patching devices to only need to sense color along one direction (the x-direction or "transverse" direction), which may allow the use of lower cost color sensing devices.

It will be appreciated that any appropriate scheme may be used for the color identification tags 160 and the predefined regions 164. For example, as shown in FIG. 3B, in another embodiment, a color identification tag 160-2 is provided that has a color pattern 162-2 that includes two strips, each of which is subdivided into six predefined regions 164-2. In this embodiment, the twelve regions 164-2 form a two-dimensional array. Assuming that each region 164-2 may be one of three different colors, the color identification tag 160-2 may provide 531,441 different unique identifiers. FIG. 3C illustrates another alternative color identification tag 160-3 in which a single, larger strip is used that is divided into nine predefined regions 164-3 that have different sizes and shapes to provide a color pattern 162-3.

It will be appreciated that the color identification tags 160 illustrated in FIGS. 3A-3C are merely illustrative. In particular, color identification tags 160 may have different shapes, different numbers of strips from what is shown herein. The color identification tags 160 will include a plurality of regions, where each region will have one of a plurality of pre-selected colors.

In the embodiments of the present disclosure discussed below with reference to FIGS. 4 and 5, it will be assumed that the color identification tags 160 on the patch cord connectors 130 have the design of the color identification tag 160-1 of FIG. 3A.

Figure 4:
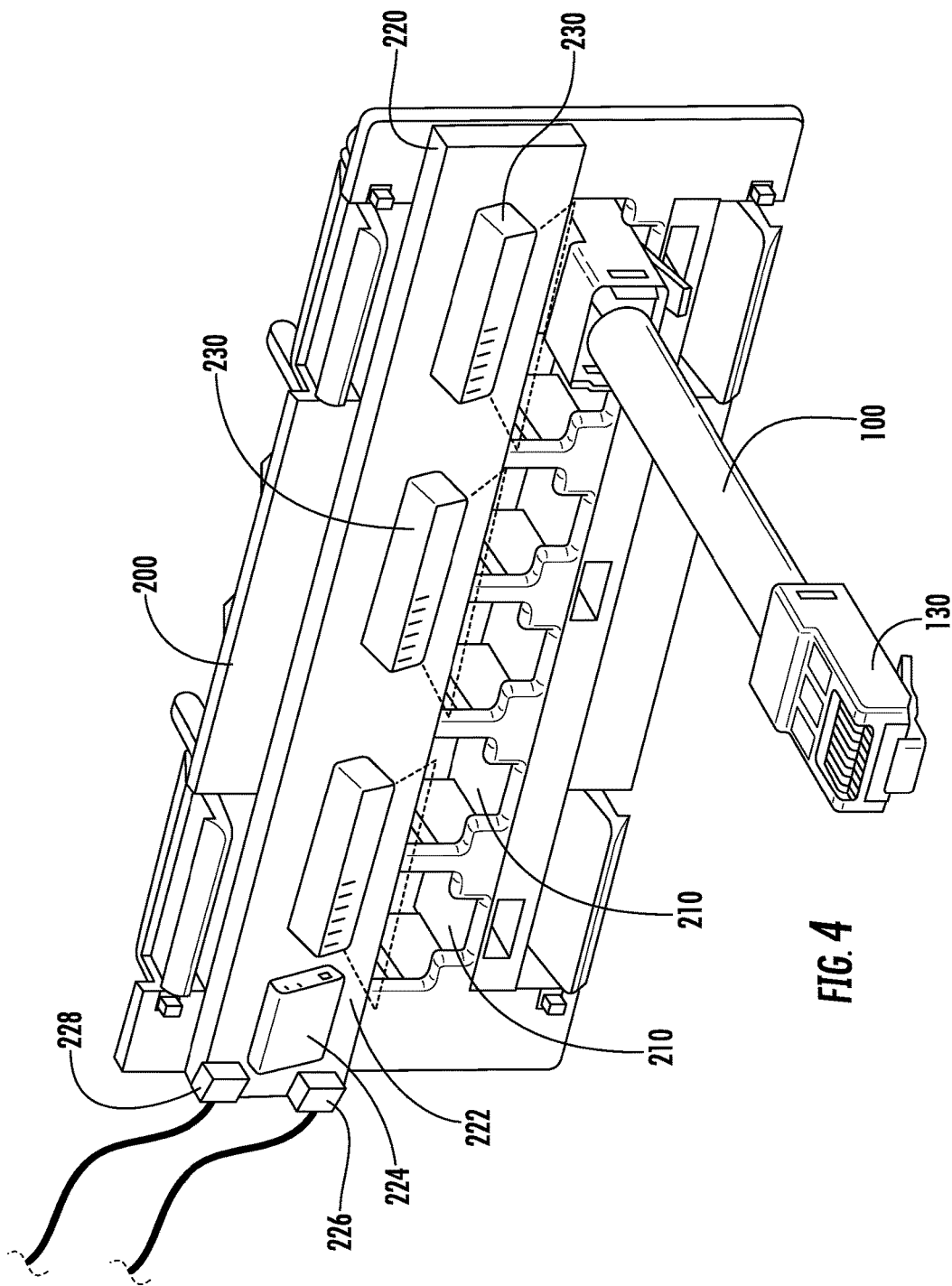
FIG. 4 is a schematic perspective view of color sensing module according to embodiments of the present disclosure mounted on a patching device such as a patch panel or a network switch.

FIG. 4 illustrates a six connector port module of a patching device 200 according to embodiments of the present disclosure. In FIG. 4, the patching device 200 comprises an intelligent patch panel including RJ-45 connector ports 210. However, it will be appreciated that the patching device 200 may be any device having connector ports such as, for example, network switches, network routers, fiber optic patch panels, fiber optic shelves and the like.

As shown in FIG. 4, the patching device 200 may include a plurality of connector ports 210. The connector ports 210 may comprise RJ-45 connector ports, fiber optic adapters, fiber optic connectors or any other type of connector port. Each connector port 210 is configured to receive a connector of a patch cord such as a connector 130 of the patch cord 100 of FIG. 2.

A color sensing module 220 is mounted above the connector ports 210. The color sensing module 220 includes one or more color sensing devices 230. Each color sensing device 230 may be positioned to detect or "read" the colors of any color identification tag 160 that is included on a connector 130 of a patch cord 100 that is plugged into one or more of the connector ports 210 of the patching device 200.

The color sensing module 220 may, for example, comprise a printed circuit board 222 that has the color sensing devices 230 mounted thereon. In some embodiments, the color sensing module 220 may also include a controller 224 that is in communications with each of the color sensing devices 230 via, for example, electrical traces (not shown) on the printed circuit board 222. The color sensing module 220 may further include a power connection 226 that provides an operating voltage that powers the color sensing devices 230 and the controller 224, and a data connection 228 that provides a means for the controller 224 and/or the color sensing devices 230 to transmit information to an external device (not shown).

Each color sensing device 230 may comprise, for example, a charge-coupled device, a contact imaging sensor or a color sensor that is configured to sense the color of different regions within its field-of-view. When a connector 130 of a patch cord 100 is plugged into any of the connector ports 210 of patching device 200, the connector port 210 effectively fixes the connector 130 at a known location in space. The color identification tag 160 that is included on the connector 130 of the patch cord 100 may also, in some embodiments, by located at a pre-selected location on the connector 130. The color sensing devices 230 may also be located in pre-selected locations on the color sensing module 220. Thus, the location of each region 164 of the color pattern 162 relative to the color sensing device 230 that is associated with a particular one of the connector ports 210 may be known in advance and may be pre-programmed to identify the color of each region 164 of the color pattern 162, and may then transmit this information to the controller 224. The controller 224 may transmit this information to an external device such as, for example, an intelligent patching controller. The intelligent patching controller may maintain a connectivity database that tracks the color pattern 162 of each patch cord connector 130 that is plugged into the connector ports 210 of the patching devices 200 of the communications system. Since the two connectors 130 of a patch cord 100 will have the same color pattern 162, the intelligent patching controller may easily determine the two connector ports 210 that are connected by any given patch cord 100.

In some embodiments, a color sensing device 230 may be provided for each connector port 210. In other embodiments, each color sensing device 230 may be configured to read the color pattern 162 on patch cord connectors 130 that are plugged into multiple of the connector ports 210. For example, in the embodiment depicted in FIG. 4, three color sensing devices 230 are provided, and each of these color sensing devices 230 is configured to read the color pattern 162 on patch cord connectors 130 that are plugged into two different connector ports 210. As shown in FIG. 4, each color sensing device 230 is centered between two connector ports 210 and has a viewing angle (shown by the dotted lines) that encompasses both of the connector ports 210. It will be appreciated that other configurations are possible, including, for example, using multiple color sensing devices 230 for each connector port 210 and using color sensing devices 230 to detect the colors of regions 164 of a color patterns 162 at non-integral numbers of connector ports 210 (e.g., each color sensing device is configured to read all of the regions 164 of a color pattern 162 at a first connector port 210-1 and half of the regions 164 of a color pattern 162 at an adjacent connector port 210-2).

Color sensing devices 230 are well known in the art, and are used, for example, in digital cameras and other digital recording devices. In example embodiments, each color sensing device 230 may comprise a one-dimensional array of charge-coupled devices that form individual pixels that detect the color of an object in the field of view of each pixel. Each color sensing device 230 may have, for example, a plurality of pixels (e.g., ten pixels) that are positioned to view one of the regions 164 of any color identification pattern 162 that is included on a connector 130 of a patch cord 100 that is inserted into a connector port 210 that the color sensing device 230 is configured to "read." Each pixel may detect a color that is present in its viewing area and a determination may be made based on these detections as to the color of the region 164. For example, in the above embodiment in which ten pixels of the color sensing device 230 will detect the color of any given region 164, if at least eight of the pixels detect the same color (e.g., red, green or blue for the color identification tag 160 of FIG. 3A), then a determination may be made that the region 164 that is read by the ten pixels is the color detected by the at least eight pixels.

A wide variety of algorithms may be used to detect the colors of each of the regions 164. It should be noted that no patch cord connector 130 may be present within a connector port 210, or a connector 130 may be inserted into the connector port 210 that does not have a color identification tag 160. The intelligent patching systems according to embodiments of the present disclosure may be designed to avoid false readings in these situations. For example, if no patch cord connector 130 is inserted into a particular connector port 210, then patch cord connectors 130 that are plugged into connector ports 210 on a patching device 200 that is mounted in a lower slot on the equipment rack may be within the field of view of the color sensing devices 230. To avoid false readings, the color sensing devices 230 may be configured to only detect the color of objects that are within a predetermined distance from the color sensing device 230, where that distance is less than the distance to the next lowest row of connector ports 210. As another example, a patch cord connector 130 may be plugged into a connector port 210 that does not have a color identification tag 160. If the housing 132 of this patch cord connector 130 is colored red, green or blue, then the color sensing devices 230 may incorrectly detect that a patch cord connector 130 that has a color identification tag 160 that has all nine regions colored red, green or blue is plugged into the connector port 210. To avoid such false readings, the system may be programmed so that certain color patterns 162 are not used to identify patch cords 100 such as color patterns 162 in which all of the regions 164 have the same color.

In the above-described embodiments, the color sensing devices 230 are programmed to detect the color of certain pre-defined areas in space which correspond to the regions 164 of the color pattern 162 of any patch cord connector 130 that is inserted into a connector port 210 that is associated with the color sensing device 230. In other words, since the location of the regions 164 of any color identification tag 160 may be known in advance, the individual pixels of the color sensing devices 230 simply sense the color in their field of view, and the sensed color is automatically associated with a particular region 164. In other embodiments the color sensing devices 230 may be programmed to "find" the exact location of any color identification tag 160 in their field of view by identifying areas that have the same color and then, based on this identification, determining the pixels of the color sensing device that are in the field-of-view of each particular region 164. While this approach requires that the color sensing devices 230 or another device such as the controller 224 perform additional processing, it may allow for use of color identification tags 160 that have a larger number of regions 164, as the exact position of each region 164 may be more precisely identified. As is known to those of skill in the art, the patch cord connectors 130 will be slightly narrower than the plug apertures of the connector ports 210 in which they are received, and hence there is a small amount of uncertainty in the transverse alignment of the color identification tag 160. Likewise, the latching mechanisms used in conventional connector ports 210 typically result in some amount of uncertainty in the longitudinal position of a patch cord connector 130 that is received within a connector port 210, and hence the regions 164 of a color pattern 162 in embodiments that do not locate the exact position of the color identification tag 160 may need to be sufficiently large such that this uncertainty in transverse and longitudinal positioning does not result in errors. If the location of the color identification tag 160 is actually determined from the pixel detections of the color sensing device 230, then it may be possible to use smaller color regions 164 and hence have a large number of unique identifiers for a given number of colors.

Tradeoffs also exist in terms of the number of colors used and the cost and accuracy of the intelligent patching system. The more colors that are used, the greater the number of unique identifiers, and hence the greater number of patch cords that may be used in the system. Moreover, the use of more colors may increase the accuracy of the system as it may allow the number of regions 164 to be reduced, thereby allowing the use of larger regions 164 which may enhance the ability of the color sensing devices 230 to accurately determine the color of these larger regions 164. However, the more colors that are used, the greater the likelihood that the color sensing devices 230 make mistakes in sensing color, as the hues of different colors become closer the more colors that are used. As colors can look different under different lighting conditions, and as colors can fade over time, the use of colors having closer hues may lead to the possibility of errors. Additionally, different types of color sensing devices 230 may have greater accuracy in distinguishing between different colors, with color sensing devices 230 that provide increased resolution also typically having increased cost. Thus, a number of tradeoffs may be considered in the system design. It is believed that 3-4 colors that are have dramatically different hues (e.g., blue, green, red and yellow) may be an appropriate number of colors to use in many cases.

In operation, the color sensing devices 230 may be controlled to detect the color of each of the regions 164 in their field of view on a periodic or non-periodic basis. For example, this determination might be made every 1 second, every 2 seconds, every 5 seconds or some other appropriate interval. In practice, it would usually not be necessary to take readings more than every second as technicians typically take at least that long to insert or remove a patch cord 100 from a connector port 210. The color sensing devices 230 may transmit information regarding the colors detected in each region 164 during each reading. In some embodiments, the color detected by each pixel may be transmitted. In other embodiments, the color sensing device 230 can make a determination with respect to a color of each region 164 and may transmit that information. In some embodiments, each color sensing device 230 may determine whether the reading for a given region 164 or for all of the regions 164 is the same as an immediately previous reading and, if so, may simply transmit a code indicating that no change has occurred. This approach requires a small amount of additional processing at each color sensing device 230, but may reduce the amount of information transmitted. Each color sensing device 230 may transmit the above-described information to a controller such as, for example, the controller 224 that is included in each color sensing module 220. The controller 224 may then transmit information to an external controller such as, for example, an intelligent patching controller. In some embodiments, the controller 224 may only transmit any information that changed since a prior reading.

The color sensing modules 220 may be mounted to the patching devices 200 in a variety of ways. In some cases, the color sensing modules 220 may be integrated into the patching devices 200 at the time of manufacture. For example, the patching devices 200 may comprise intelligent patch panels that have the color sensing modules 220 integrated into the patch panel either above or below the connector ports 210 thereof at the time of manufacture. In other cases, the manufacturer of the color sensing modules 220 may be different than the manufacturer of the patching devices 200. For example, network switch manufacturers usually do not also sell intelligent patching systems, and hence network switches typically do not include any intelligence for tracking patch cord connections. Accordingly, color sensing modules 220 may be provided that have mounting structures for mounting on network switches such as, for example, adhesive backings, screw holes or the like that allow the color sensing modules 220 to be mounted on the network switch post-manufacture.

As noted above, the color sensing modules 220 may include a power connection 226 for receiving an operating voltage that powers various electronic devices thereof and a data connection 228 so that the color sensing modules 220 can transmit information regarding the color patterns 162 included on patch cord connectors 130 that are plugged into the connector ports 210 of the patching device 200 on which the color sensing module 220 is mounted. The power connection 226 and the data connection 228 may be used to power the color sensing module 220 and to allow the color sensing module 220 to communicate with external devices such as an intelligent patching controller.

Figure 5:
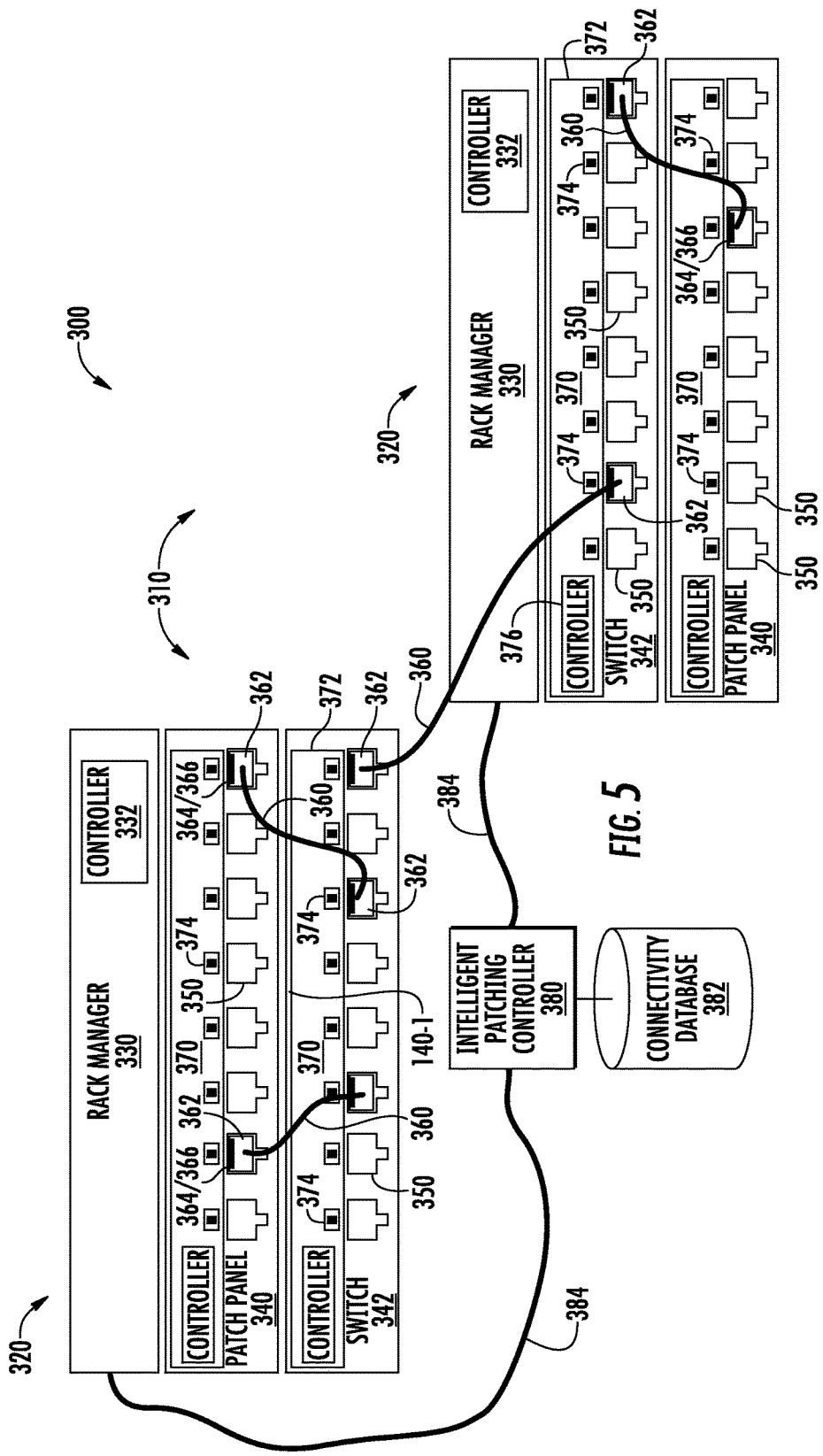
FIG. 5 is a schematic front view of an intelligent patching system according to embodiments of the present disclosure.

FIG. 5 is a schematic front view of a patching field 310 of a communication system 300 according to embodiments of the present disclosure that will be used to explain methods of automatically tracking patching connections. In FIG. 5, two equipment racks 320 of the patching field 310 are illustrated, each of which has patching devices and a rack controller 330 mounted thereon. In the depicted embodiment, each equipment rack 320 includes two patching devices, namely an intelligent patch panel 340 and a network switch 342.

It will be noted that FIG. 5 depicts a very simple communications patching system 300 with two eight-connector port patch panels 340, two eight connector port switches 342 and a pair of rack controllers 330 for purposes of illustrating operation of embodiments of the present disclosure. It will be appreciated that typical communications patching systems in which the present disclosure will be employed will be much larger and far more complex than the exemplary system shown in FIG. 5. It will likewise be appreciated that each patching device 340, 342 will typically have more than eight connector ports 350.

As shown in FIG. 5, patch cords 360 may be connected between various of the connector ports 350 on the patching devices 340, 342. Each patch cord 360 includes a first connector 362 on one end and a second connector 362 on the other end. A color identification tag 364 that has an embedded color pattern 366 is provide on each patch cord connector 362. The color identification tags 364 and color patterns 366 thereon are schematically illustrated in FIG. 5 by a bold line.

Each patching device 340, 342 includes a color sensing module 370. Each color sensing module 370 includes a printed circuit board 372 that is mounted on the front face of the patching device 340, 342 above the connector ports 350. A plurality of color sensing devices 374 are also mounted on the printed circuit board 372. In the depicted embodiment, a separate color sensing device 374 is provided for each connector port 350 and hence there is a one-to-one correspondence between connector ports 350 and color sensing devices 374. Each color sensing device 374 is configured to detect the colors of a plurality of areas that are within its field of view, where the areas correspond to the regions of the color patterns 366 included on a color identification tag 364 that is mounted on the connector 362 of any patch cord 360 that is plugged into the respective connector port 350 that is below each color sensing device 374. Each color sensing module 370 in the depicted embodiment also includes a controller 376 that receives information regarding the colors detected by each color sensing device 374.

The communications system further includes an intelligent patching controller 380 and a connectivity database 382. Each rack manager 330 includes a controller 332. The controller 374 on each color sensing module 370 may be in communication with the controller 332 on its associated rack controller 330, and the controller 332 on each rack controller 330 may be in communication with the intelligent patching controller 380. The controllers 374 may be in communication with the controller 332 on their associated rack controller via, for example, a ribbon cable, an RJ-45 patch cord or the like (not shown). A power connection may also be provided (not shown) that provides power to each color sensing module 370. Each rack controller 330 may be in communication with the intelligent patching controller 380 over a wired connection 384.

At periodic intervals (e.g., once per second), the color sensing devices 374 on each patching device 340, 342 may detect the colors in a plurality of pre-determined regions that are in the field-of-view of each color sensing devices 374. Each region may correspond to a region of a color pattern 366 of a color identification tag 364 of any patch cord connector 362 that is plugged into the connector port 350 that is below the respective color sensing device 374. As discussed above, the color sensing devices 374 may be designed so that they will not sense colors of patch cord connectors 362 that may be in plugged into a connector port 350 of a patching device 340, 342 that is in a lower position on the equipment rack 320. If a patch cord 360 that has a connector 362 that does not include a color identification tag 364 is plugged into a connector port 350, the associated color sensing device 374 will typically sense the same color for each region, namely the color of the housing of the connector 362. As noted above, color patterns having a single color will typically not be used as unique identifiers, and hence when such a "color pattern" is forwarded to the intelligent patching controller 384 it will be identified as a patch cord that does not include a color identification tag 364. If, on the other hand, a patch cord 360 that has a color identification tag 364 is plugged into a connector port 350, then the color sensing device 374 will detect the colors of each of the regions of its color pattern 366. The detected colors for the regions are transmitted from the color sensing device 374 to the controller 376 via traces on the printed circuit board 372. The controller 376 determines if anything has changed since the least reading (i.e., if the color pattern 366 detected by any of the color sensing devices 374 is different than the last color pattern detected). If, for example, a different color pattern is detected at one of the connector ports 350, the newly detected color pattern 366 and an identification of the connector port 350 at issue may be transmitted to the intelligent patching controller 380 via the controller 376 and the controller 332 on the rack manager 330. The intelligent patching controller 380 may then update the connectivity database 382 with this new information. Note that the new information may indicate that a patch cord connector 362 was plugged into a connector port 350 or that a patch cord connector 362 was removed from a connector port 350.

Figure 6:
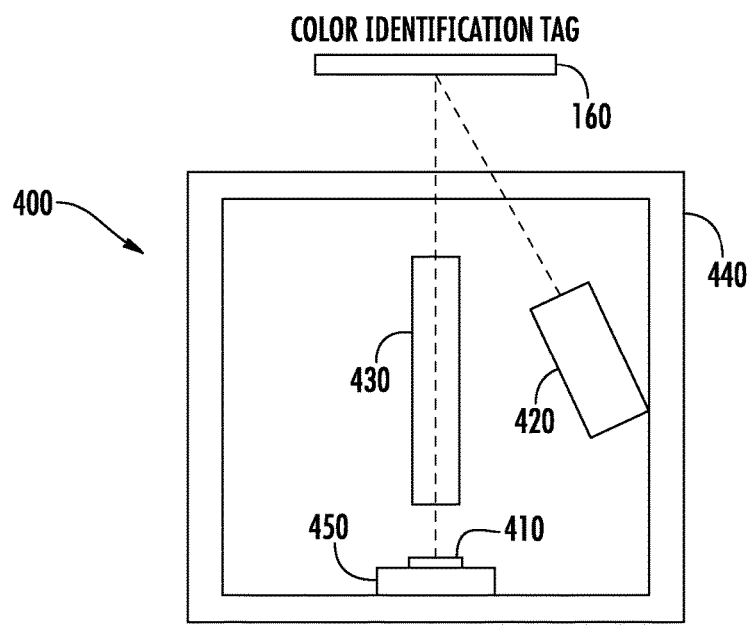
FIG. 6 is a schematic diagram of a contact image sensing system that may be used as a color sensing device according to embodiments of the present disclosure.

While charge-coupled devices have been used as an example of an implementation of the color sensing devices 230 according to embodiments of the present disclosure, it will be appreciated that other color sensing devices 230 may be used. For example, in other embodiments, contact image sensors such as SELFLOC lens arrays that are available from GoFoton (www.gofoton.com) may be used to implement the color sensing devices 230. FIG. 6 illustrates operation of such a contact image sensor system 400. As shown in FIG. 6, the contact image sensor system 400 includes a contact image sensor 410, one or more LEDs 420 (or LED arrays) that are used to illuminate the target of the sensing operation (i.e., here, the color identification tag 160 having a color pattern 162), and a lens system 430. These components may be mounted in a housing 440. The contact image sensor 410 may be mounted on a printed circuit board 450. The LEDs 420 illuminate the color identification tag 160, and the reflected light from the LEDs 420 passes through the lens system 430 to the image sensor 410. The image sensor 410 then determines the colors of each region 164 of the color identification tag 160. The lens system 430 may include, for example, a plurality of rod lens.

Figure 7A:
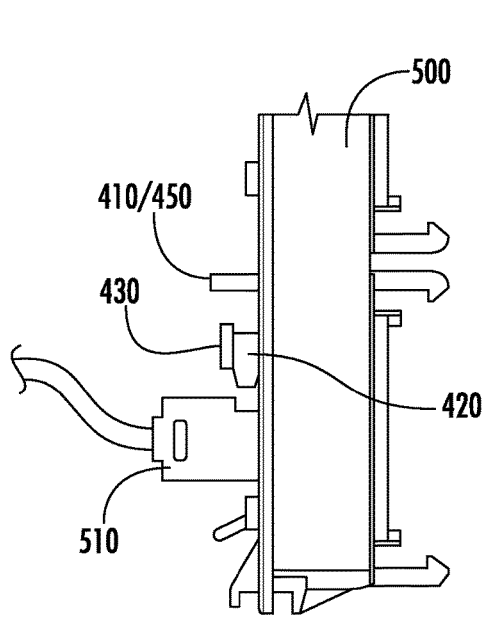
FIG. 7A is a schematic side view of a patching device according to embodiments of the present disclosure that uses a contact image sensor as the color sensing device.
Figure 7B:
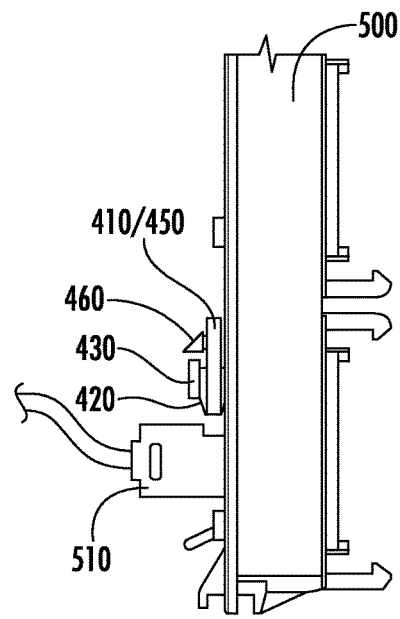
FIG. 7B is a schematic side view of a patching device according to further embodiments of the present disclosure that uses a miniaturized contact image sensor as the color sensing device.

Utilizing a contact image sensor system such as the system 400 of FIG. 6 may be difficult because of space constraints, as state-of-the-art patch panels, network switches and other patching devices may have a very high density of connector ports per unit area. For example, FIG. 7A is a schematic side view of a patching device 500 according to embodiments of the present disclosure that uses a contact image sensor 400 as the color sensing device 230. As shown in FIG. 7A, a plug 510 is inserted into a connector port (not visible) of the patching device 500. The contact image sensor 400 is mounted above the connector port with the LEDs 420 and lens system 430 mounted directly above the connector port, and the printed circuit board 450 with the image sensor 410 thereon mounted above the LEDs 420 and lens system 430. The printed circuit board 450 is mounted in a horizontal orientation. As shown in FIG. 7B, pursuant to further embodiments of the present disclosure, a prism or mirror 460 may be provided that redirected the light output from the lens system 430 onto the printed circuit board 450. This arrangement allows the printed circuit board 450 to be mounted vertically (or at any other angle) and, in the illustrated embodiment, to be mounted within the housing structure for the LEDs 420. As can be seen by comparing FIGS. 7A and 7B, this may significantly reduce the amount of space required to implement the contact image sensor system 400.

While embodiments of the present disclosure have primarily been described above with respect to patching devices that have RJ-45 jacks and Ethernet communications cables, it will be appreciated that the above-described techniques may work equally well with fiber optic patching devices and communications cables. This is in contrast to various other intelligent patching technologies (e.g., the use of common mode signalling) that may only work on Ethernet cables and connectors. Additionally, while FIG. 1 illustrates application of the patching techniques according to embodiments of the present disclosure in a cross-connect patching system, it will be appreciated based on the above disclosure that these patching techniques can also be applied in interconnect patching systems by mounting the color sensing modules on network switches and other network equipment, and providing separate power and data connections to the color sensing modules, as discussed above with reference to FIG. 5.

While in the embodiments described above separate processors are provided at each patching device, on the rack controller, and at the intelligent patching controller, it will be appreciated that in other embodiments, the processing may be more or less distributed without departing from the teachings of the present disclosure. For example, in other embodiments, the processor on the rack controller 130 could also perform the functionality of the processors on the patching devices, thereby eliminating the need for the processors on the patching devices. Likewise, the functionality of the intelligent patching controllers could be moved to the rack controllers, or vice versa. Thus, it will be appreciated that the necessary processing may be performed in any appropriate location without departing from the present disclosure.

The present disclosure has been described with reference to the accompanying drawings, in which certain embodiments are shown. The embodiments may, however, be embodied in many different forms and should not be construed as limited to the embodiments that are pictured and described herein; rather, these embodiments are provided so that this disclosure will be thorough and complete, and will fully convey the scope of the embodiments of the present disclosure to those skilled in the art. It will also be appreciated that the embodiments disclosed above can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

In the drawings and specification, there have been disclosed typical embodiments of the invention and, although specific terms are employed, they are used in a generic and descriptive sense only and not for purposes of limitation, the scope of the invention being set forth in the following claims.

I claim:
1. An intelligent patching system, comprising:
a first patching device that includes a first plurality of connector ports and a first color sensing module that includes a first plurality of color sensing devices mounted above or below the first plurality of connector ports;
a second patching device that includes a second plurality of connector ports and a second color sensing module that includes a second plurality of color sensing devices mounted above or below the second plurality of connector ports; and
wherein each port of the first plurality of connector ports and the second plurality of connector ports are configured to receive a patch cord comprising a communications cable that includes at least one communication path, a first connector that is attached to a first end of the communications cable that includes a first color identification tag that has a first color pattern, and a second connector that is attached to a second end of the communications cable that includes a second color identification tag that has the first color pattern that has a plurality of predefined regions, each region colored one of a plurality of pre-selected colors, wherein the first color pattern is not included on a color identification tag of a connector of any other patch cord of the intelligent patching system;
wherein the first color sensing module comprises a first controller coupled to the first plurality of color sensing devices, and a data connection to an external intelligent patching controller, wherein information regarding color patterns detected by the first color sensing module is transmitted to the external intelligent patching controller;
wherein the second color sensing module comprises a second controller coupled to the second plurality of color sensing devices, and a data connection to the external intelligent patching controller, wherein information regarding color patterns detected by the second color sensing module is transmitted to the external intelligent patching controller;
wherein the external intelligent patching controller is configured to log a patching connection of the patch cord between the first plurality of connector ports and the second plurality of connector ports in a connectivity database in response to detecting the first color pattern at a first connector port of the first plurality of connector ports and at a second connector port of the second plurality of connector ports.
2. The system of claim 1, wherein the communications cable comprises four twisted pairs of insulated conductors enclosed in a cable jacket.

3. The system of claim 1, wherein the communications cable comprises at least one optical fiber.

4. The system of claim 1, wherein the regions are arranged in a one-dimensional array.

5. The system of claim 1, wherein the first color sensing module further comprises a printed circuit board, and the plurality of color sensing devices comprise a plurality of charge-coupled device-based color sensing elements.

6. The system of claim 1, wherein the first patching device comprises a patch panel and the second patching device comprises a network switch.

7. The system of claim 1, wherein the second color sensing module further comprises a controller on a printed circuit board, the printed circuit board further comprising an external power connection that is powered by a separate device.

8. The system of claim 1, wherein the first patching device comprises a patch panel and the second patching device comprises a patch panel.

9. The system of claim 1, wherein the first color sensing module further comprises a printed circuit board, and the plurality of color sensing devices comprise a plurality of contact image sensors.

10. The system of claim 9, wherein the first color sensing module further comprises a prism or mirror, and the printed circuit board is mounted parallel to a front face of the first patching device.

11. A method of automatically tracking a patching connection within an intelligent patching system between a first connector port of a first patching device and a second connector port of a second patching device, the method comprising:
   using a first color sensing device of a first color sensing module that is mounted on the first patching device to read a first color identification tag of a first connector of a patch cord that has a first color pattern that is plugged into the first connector port, wherein the patch cord comprises a communications cable that includes at least one communication path, wherein the first connector is attached to a first end of the communications cable that includes the first color identification tag, wherein the patch cord further comprises a second connector that is attached to a second end of the communications cable that includes a second color identification tag that has the first color pattern, wherein the first color pattern is not included on a color identification tag of a connector of any other patch cord of the intelligent patching system;
   transmitting information regarding a color pattern of the first color identification tag to an external patching controller;
   using a second color sensing device of a second color sensing module that is mounted on the second patching device to read the second color pattern that is on the second color identification tag of the second connector of the patch cord that is plugged into the second connector port;
   transmitting information regarding a color pattern of the second color identification tag to the external patching controller; and
   logging a patching connection between the first connector port and the second connector port in a connectivity database, by the external patching controller in response to detecting the first color pattern at the first connector port and at the second connector port.

12. The method of claim 11, wherein the first patching device comprises a network switch, a network router, a network server, a mainframe computer, a network storage device, or a blade server.

13. The method of claim 11, wherein logging the patching connection between the first connector port and the second connector port comprises logging a connection of a patch cord comprising:
   a communications cable that includes a first conductor and a second conductor that form a first differential pair, a third conductor and a fourth conductor that form a second differential pair; a fifth conductor and a sixth conductor that form a third differential pair, a seventh conductor and an eighth conductor that form a fourth differential pair; and
   a plug that is attached to a first end of the communications cable, the plug comprising:
      a plug housing that receives the communications cable;
      first through eighth plug contacts that each are at least partially within the housing and that are electrically connected to the respective first through eighth conductors; and
      a color identification tag that has a first color pattern that is a unique identifier for the patch cord.

14. The method of claim 13, wherein the color identification tag comprises a label that is mounted on the plug housing.

15. The method of claim 13, wherein the color identification tag is mounted within the plug housing and is visible through the plug housing.

16. The method of claim 13, wherein the plug housing includes a plug latch on a bottom side thereof, and wherein the color identification tag is mounted on or within a top side of the housing.

17. The method of claim 16, wherein the plug housing includes first through eighth longitudinal slots that expose the respective first through eight plug contacts, and wherein the color identification tag is positioned along a longitudinal axis between the first through eighth longitudinal slots and the communications cable.

18. The method of claim 13, wherein the first color pattern comprises a plurality of regions that form a one-dimensional or two-dimensional array, wherein each region has one of three different colors.

19. The method of claim 13, wherein the plug is a first plug and the color identification tag is a first color identification tag, the patch cord further comprising:
   a second plug that is attached to a second end of the communications cable, the second plug comprising:
      a plug housing that receives the communications cable;
      first through eighth plug contacts that each are at least partially within the housing and that are electrically connected to the respective first through eighth conductors; and
      a second color identification tag that has the first color pattern.

20. The method of claim 13, wherein the first color identification tag is positioned at a pre-determined location on the plug housing.

* * * * *